United States Patent [19]

Johnson et al.

[11] 4,095,045

[45] June 13, 1978

[54] METHOD AND APPARATUS FOR SIGNALING IN A COMMUNICATION SYSTEM

[75] Inventors: Charles P. Johnson, Westport; Frederick A. Lucas, Brookfield, both of Conn.

[73] Assignee: General DataComm Industries, Inc., Wilton, Conn.

[21] Appl. No.: 760,666

[22] Filed: Jan. 19, 1977

[51] Int. Cl.² .................................................. H04L 11/00
[52] U.S. Cl. ........................................... 178/2 R; 178/3; 178/58 R
[58] Field of Search .............. 178/2 R, 2 B, 2 C, 2 D, 178/2 E, 3, 4, 4.1 R, 4.1 A, 4.1 B, 4.1 C, 58, 50 R; 340/147 MD, 147 PC; 179/2 DP; 343/225, 226

[56] References Cited

U.S. PATENT DOCUMENTS 3,549,809  12/1970  Stehr ................................ 179/2 DP

*Primary Examiner*—Thomas A. Robinson

*Attorney, Agent, or Firm*—Pennie & Edmonds

[57] ABSTRACT

A method and apparatus are disclosed for using a specified pattern of signal events for signaling in a digital communication system. Illustratively, detection of a first event in a control signal activates timing apparatus which looks for a second event in a control signal within a specified time "window" and at least one additional event in either a data or a control signal within a specified time period. Preferably, the first event is a drop in one of the carrier detect or request to send signals and the second event is a rise in the same signal. The additional event illustratively is reception of two identical data characters, each representing an address and an operation code. Each of these two characters must be received and compared for verification within the specified time period in order to produce an output control signal decoded from the operation code. This signal may be used for any application such as the activation of a terminal to receive data, the initiation of a test sequence, or a change of the network configuration.

36 Claims, 5 Drawing Figures

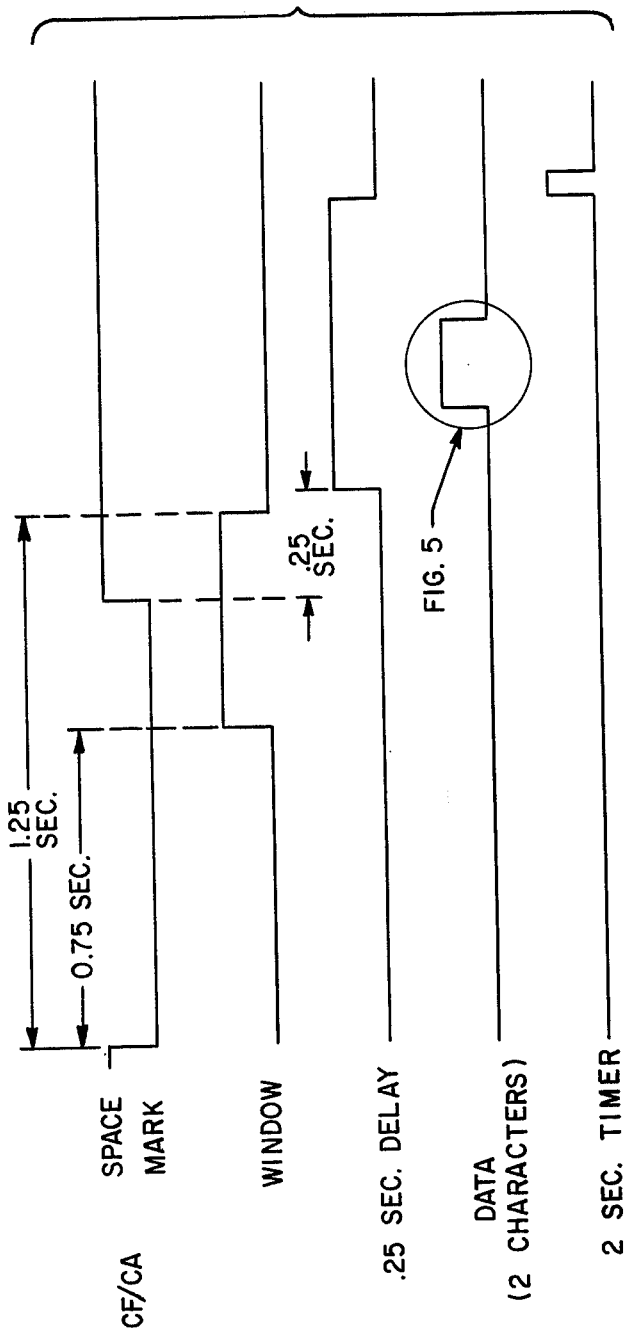
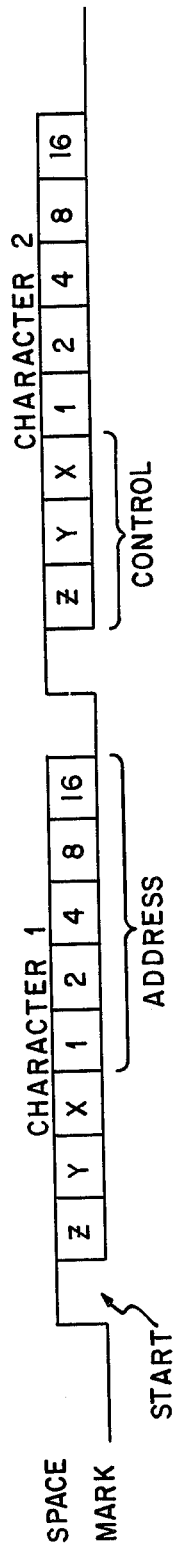

METHOD AND APPARATUS FOR SIGNALING IN A COMMUNICATION SYSTEM

BACKGROUND OF THE INVENTION

This concerns a method and apparatus for signaling in a communication system.

A specific use for our invention is in private line data networks in which several subscriber terminals are connected over one or more private lines to a central processing unit (CPU). To provide for efficient use of available communication equipment one or more private line networks may be used to group together subscriber terminals in one locality and another private line may be used to link them to a centrally located computer. Advantageously, the subscriber terminals may be grouped together by a polled network which is similar to a party-line network in the public telephone system. Thus, the whole system may comprise a multitude of subscriber terminals, one or more polled private line networks, a second private line network, one or more remote terminals to link the polled networks to the second private line network, and the CPU.

Extensive description of typical communication systems and the apparatus used in them may be found in Bell Telephone Laboratories, *Transmission Systems for Communications* (revised 4th ed. 1971); in James Martin, *Telecommunications and the Computer*, (Prentice Hall, 1969); in U.S. Pat. No. 3,769,454 to R. A. Liberman, W. C. Bond, and E. J. Soltysiak, entitled "Method and Apparatus for Testing Teletypewriter Terminals", assigned to General DataComm Industries, Inc.; and in the Bell System Data Communications Technical Reference entitled "Characteristics of Teletypewriter Exchange Service", (September, 1970) available from: Engineering Director — Data Communications, American Telephone and Telegraph Company, 195 Broadway, New York, New York 10007.

Of particular interest in any communication system is the interface between the communication line and the terminal. A modem or data set is ordinarily used to interface business equipment in a subscriber terminal to the communication line and another modem is used to interface that communication line at the remote terminal.

In any digital communication system, data are represented by different discrete levels of a parameter such as amplitude, frequency, phase or base band pulses. Most digital communication presently is binary in form, that is, each digital signal has one of only two possible states, a MARK, which is "1", or a SPACE which is "0", and represents a bit of information. As is well known, such data signals are transmitted at varying bit rates depending on the equipment used.

In numerous situations it is also necessary to transmit signals between the CPU and the subscriber which do not represent data. For example, when the CPU has data to be transmitted to a particular subscriber in a polled network it must also be able to activate that subscriber's terminal without activating all the other terminals connected to the network.

Several techniques are available for such non-data signaling in a data communication system. By far the most prevalent is the method of transmitting both data and non-data signals as patterns of MARKS and SPACES in one continuous bit stream in the same communication channel. By using a predetermined pattern of MARKS and SPACES as a sync signal to identify the beginning of a message and pre-specified formats for the location of subsequent non-data signals and data signals in the bit stream of MARKS and SPACES that is present on the communication channel, it is possible to separate the non-data signals from the data signals. Thus an individual terminal in a polled network can be activated by transmitting an address code and an operation code in the form of a data character which is recognized and acted upon by the terminal addressed in the address code. Alternatively, special codes such as pseudorandom patterns of MARKS and SPACES are used to distinguish control signals from data. Another possibility is to use a second communication channel for the control signals that must be sent between the CPU and the subscriber's terminal.

These techniques, however, have their limitations. Since the non-data signals in the first two techniques are patterns of MARKS and SPACES arranged in data character format just like the data characters in the data signals and since the way in which they are processed depends critically on the initial recognition of certain predetermined patterns of MARKS and SPACES in the bit stream of MARKS and SPACES, there is always the possibility that the pattern in a data signal might be the same as that in a sync signal or other non-data signal. This could lead to misinterpretation of a data signal as a non-data signal. With respect to use of a second communication channel for control signaling, such an alternative is generally unattractive economically.

SUMMARY OF THE INVENTION

We have found that signaling in a digital communication system may be improved by use of a pattern of signal events occurring within a specified time period and including at least one control signal which is not a part of the bit stream of MARKS and SPACES that includes the data signal. Numerous such control signals are available at the interface between a communication channel and a terminal. For example, on the terminal side of modem or data set, in addition to the bit stream of MARKS and SPACES which is available on a DATA line, there is a clock signal on a CLOCK line, a carrier detect signal on a CARRIER DETECT line and approximately twenty other signals indicative of various operating parameters of the communication system. Several of these signals can be controlled by the CPU without degrading the performance of the communication system and therefore can be used to provide one or more signals distinct from the bit stream of MARKS and SPACES on the DATA line.

Since at least some of these signals are usable to control terminal operations, we will refer to all signals except the clock signal and those which are part of the bit stream of MARKS and SPACES as "control" signals. Thus, the term control signals includes the carrier detect signal, and signals which are, or can be, derived from any electromagnetic energy received at a terminal including the bit stream of MARKS and SPACES. We will refer to the bit stream as the "data" signal since it contains the data being transmitted. This usage of control signals and data signals is consistent with the definition of control circuits and data circuits set forth in Electronic Industries Association Standard RS-232-C, "Interface Between Data Terminal Equipment and Data Communication Equipment Employing Serial Binary Data Interchange" (August 1969). As will be apparent, in practicing our invention, the data signal may also contain information such as address codes and operation codes which are not true data signals. In the prefered embodiment of our invention such information is organized as a data character representing an address code and an operation code.

Illustratively, detection of a first event in a control signal activates timing apparatus which looks for a second event in a control signal within a specified time "window" and at least one additional event in either a data or a control signal within a specified time period. Preferably, the first event is a drop in one of the carrier detect or request to send signals and the second event is a rise in the same signal. The additional event illustratively is reception of two identical data characters, each representing an address and an operation code. These two characters must be received and compared for verification within the specified time period in order to produce an output control signal decoded from the operation code. This signal may be used for any application such as the activation of a terminal to receive data, the initiation of a test sequence, or a change of the network configuration.

In the foregoing description and hereafter the term "event" is used in its broadest sense to refer to any activity in a digital communication line that can be recognized or detected by whatever means. In conventional binary communications, the minimum such activity is a rising or falling waveform occurring during a signal transition and is typically detected by a conventional zero crossing detector. However, numerous other devices and techniques are available to detect the occurrence of a transition.

BRIEF DESCRIPTION OF THE DRAWING

These and other objects, features and elements of our invention will be more readily apparent from the following detailed description of the drawing in which:

FIGS. 4 and 5 are timing diagrams and waveforms used in the practice of the illustrative method and apparatus set forth in FIGS. 2 and 3.

DETAILED DESCRIPTION OF THE INVENTION

Figure 1:
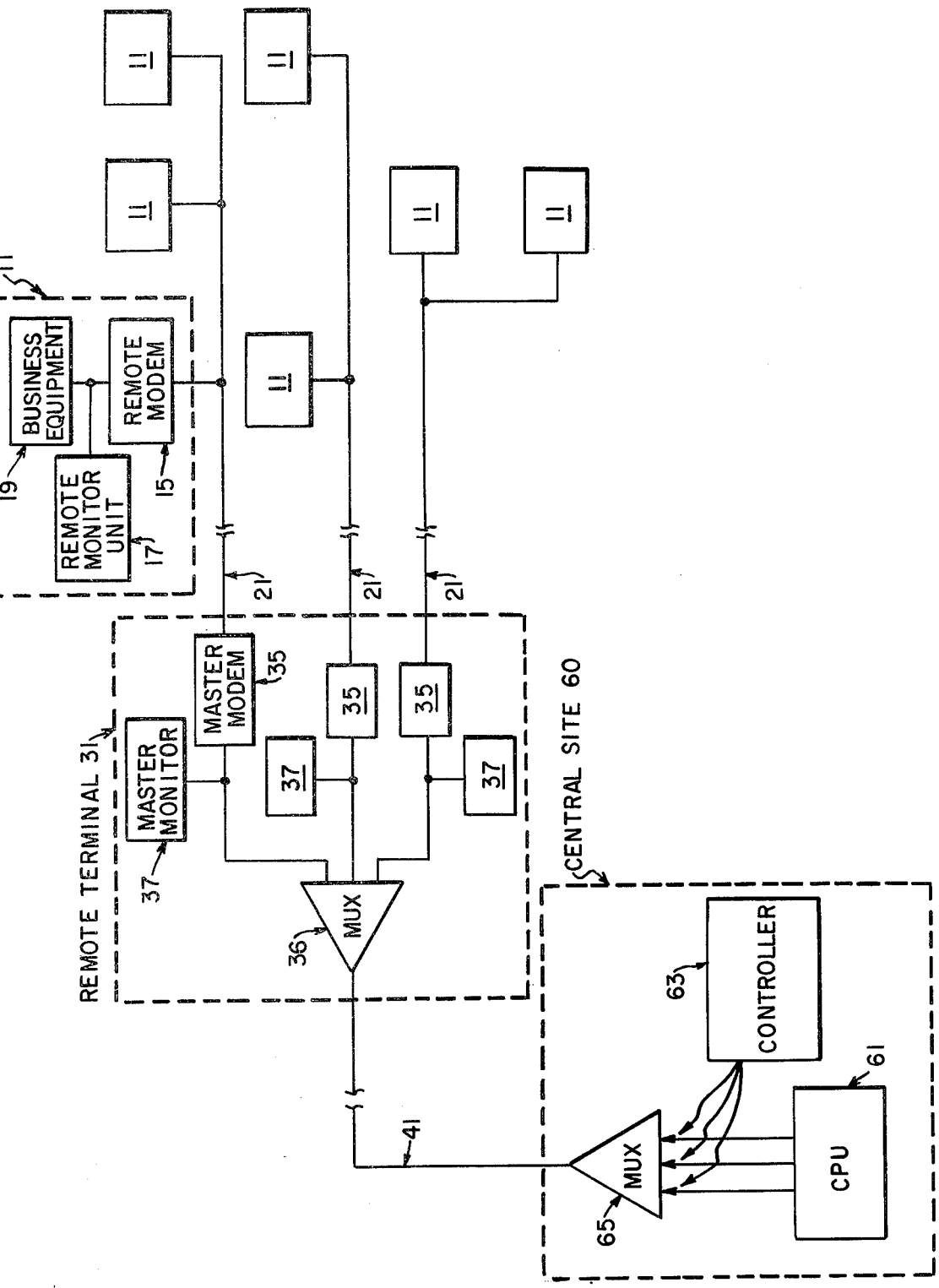
FIG. 1 is a block diagram of a typical communication system in which the invention may be used.

FIG. 1 illustrates a typical communication system in which our invention may be used. In this system, a multitude of subscriber stations 11 are connected by means of polled private line networks 21 to a remote terminal 31 which is connected, in turn, by a private line 41 to a central processing unit (CPU) 61. Typically, each subscriber station 11 includes a remote modem 15, a monitoring unit 17 and some type of business equipment 19 which provides input to and/or output from CPU 61. The remote terminal 31 contains a master modem 35 and a master monitoring unit 37 for each private line 21, as well as a multiplexer 36, either time division (TDM) or frequency division (FDM). At the central site 60, there is another multiplexer 65 and a controller 63.

The modems used in our invention are conventional. They may, for example, be standard Bell System 201-type modems such as those now made by several manufacturers. The TDM or FDM multiplexers 36, 65 likewise are conventional TDM or FDM transmitting and receiving equipment. The operation of a communication system such as that of FIG. 1 is well known to those skilled in the art. It must be emphasized that such a communication system is only illustrative of the systems that may be used in the practice of our invention. Our invention may be practiced using any kind of communication system in which information is transmitted in digital form.

Monitoring units 17, 37 provide apparatus for detecting signals in accordance with our invention. These units are identical except that monitoring unit 17 is used at a subscriber terminal and illustratively monitors signal events on the carrier detect (CF) and the received (BB) DATA lines while master monitoring unit 37 is used at a remote terminal of a TDM or FDM system and illustratively monitors signal events on the REQUEST TO SEND (CA) and TRANSMITTED (BA) DATA lines.

Figure 2:
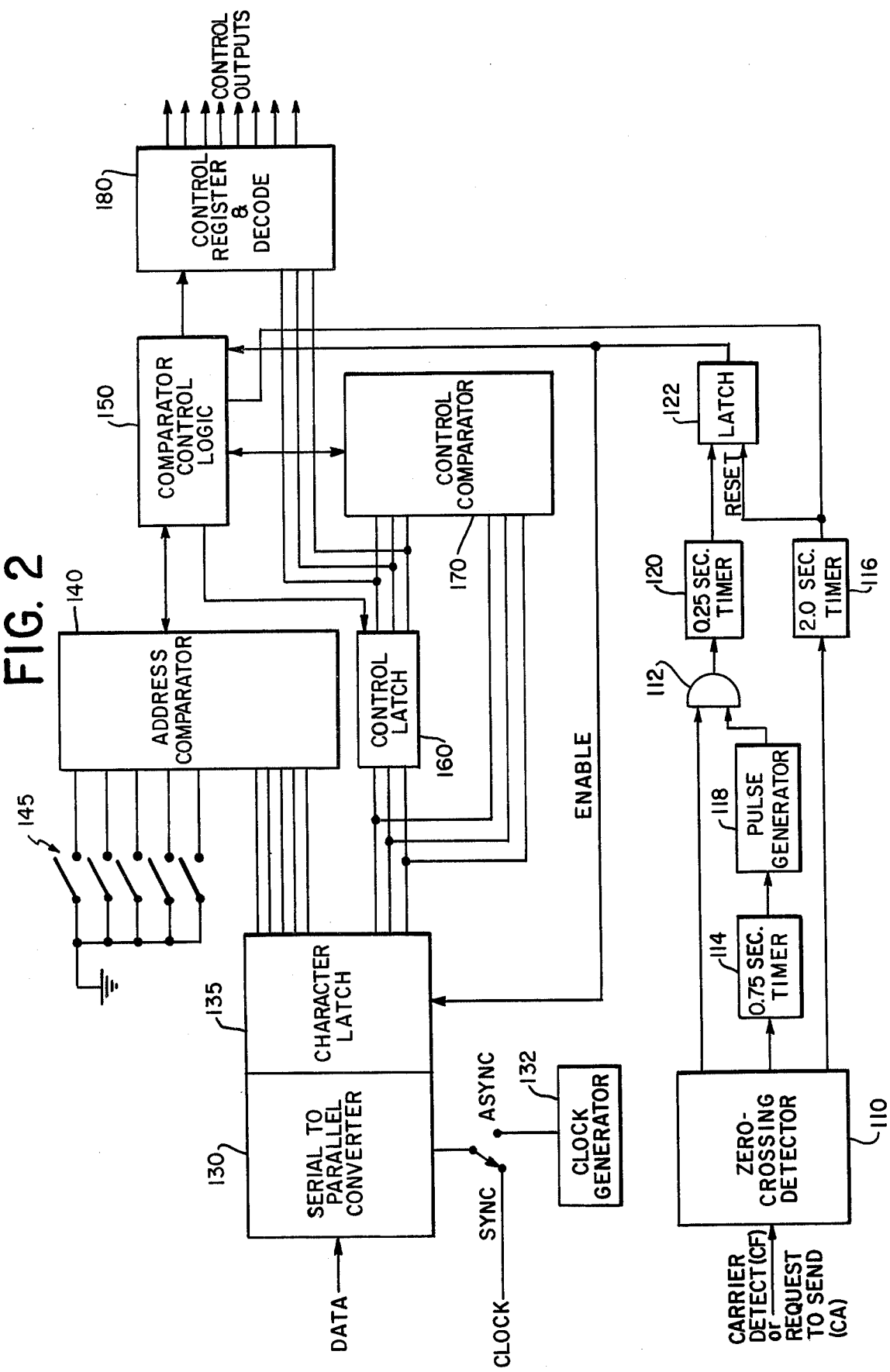
FIG. 2 is a block diagram of illustrative apparatus used in the practice of the invention.
Figure 3:
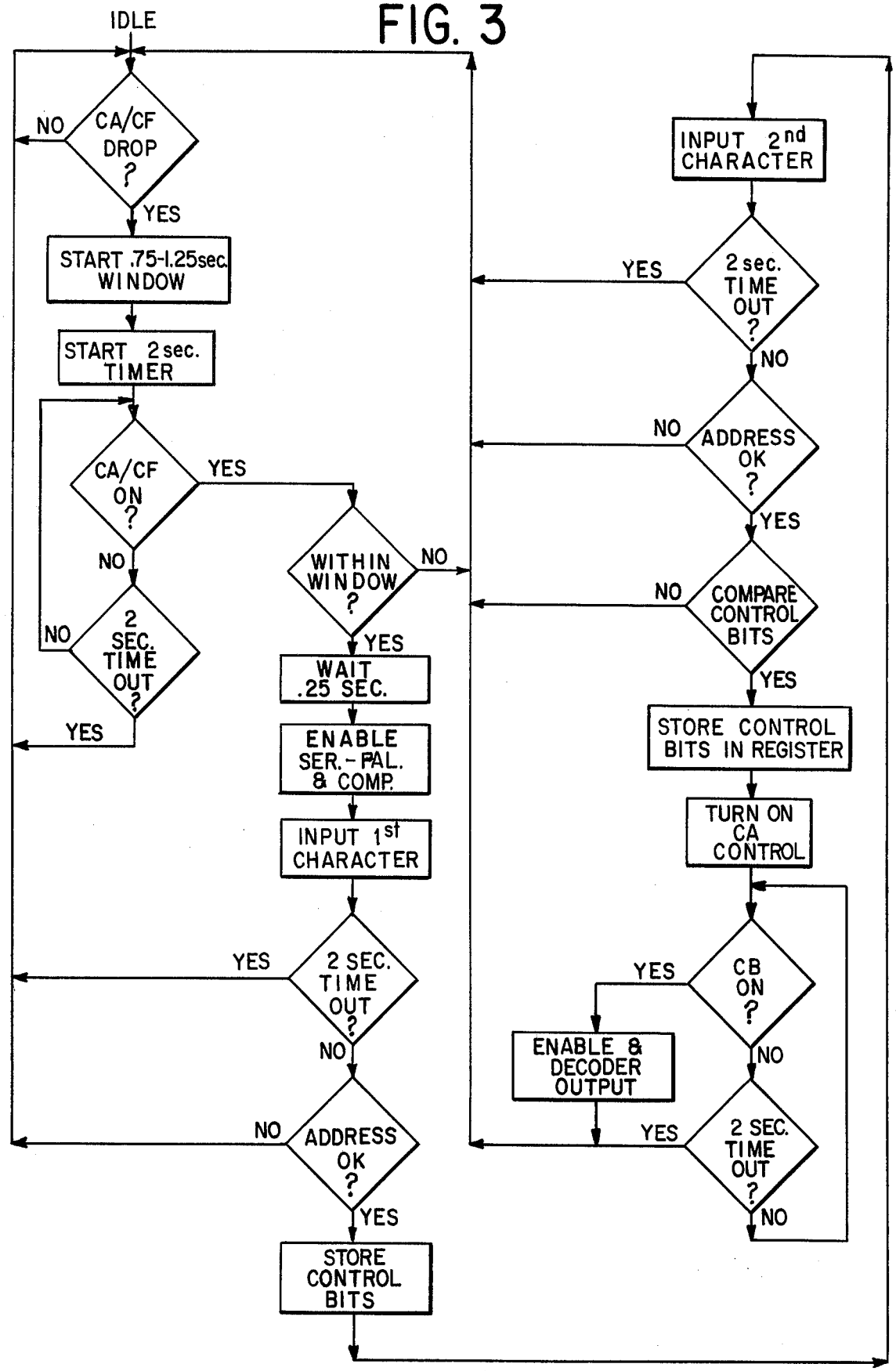
FIG. 3 is a flow chart of one illustrative method of practicing the invention.

An illustrative embodiment of monitoring unit 17 is shown in FIG. 2, and a flow chart setting forth the operation of this apparatus is depicted in FIG. 3. The inputs to the unit include a carrier detect line, a DATA line, and, in the case of a synchronous communication system, a CLOCK line. All these lines, and several others which are not shown in FIG. 2, are available as outputs from the demodulator of conventional modems. Since the signals on these lines are ultimately derived from the CPU 61 or controller 63, the CPU or controller can use these signals to transmit information such as control signals and data signals to the subscriber terminal.

Ordinarily, energy is always present on private line 21 from the master modem 35 to the remote modems 15, with the result that there is always a signal on the CARRIER DETECT line from each modem 15 to the business equipment 19 in each subscriber station 11. Likewise, there ordinarily is always a request to send signal being transmitted from CPU 61 or controller 63 to remote terminal 31 where the signal may be applied to master monitoring unit 37 in the same fashion as the carrier detect signal is applied to monitoring unit 17.

In the preferred embodiment of the invention an operating instruction in the form of an operation code is transmitted to a particular subscriber station 11 identified by an address code. The transmission process begins when CPU 61 or controller 63 signals remote terminal 31 to drop the carrier signal on private line 21. As a result the signal on the CARRIER DETECT line changes from one binary level to another as shown in FIG. 4.

The carrier detect signal is applied to a zero-crossing detector 110 whose output is applied to an AND gate 112, a 0.75 second timer 114, and a 2.0 second timer 116. The output of timer 114 is applied to a pulse generator 118 which produces a 0.5 second output pulse which enables AND gate 112 during a "window" which lasts from 0.75 to 1.25 seconds after a change in the carrier detect signal is detected by zero crossing detector 110. Since AND gate 112 is not enabled before 0.75 seconds, the initial transition in the carrier detect signal is blocked by gate 112.

If a second transition in the carrier detect signal occurs 0.75 to 1.25 seconds after the first, AND gate 112 transmits the signal from zero crossing detector 110 to a 0.25 second delay timer 120. This permits the signal on the DATA line from the modem to settle and provides protection against detection of erroneous control signals. At the end of the 0.25 second delay, a latch 122 is set which enables that portion of the monitoring unit which processes the data signal. Latch 122 is reset and the data processing portion disabled at the end of the 2.0 second delay produced by timer 116 or on the failure of certain comparisons detailed below. Illustrative waveforms and timing for the carrier detect signal, the window, the delay, and the 2.0 second timer are depicted in FIG. 4.

Illustratively, each data character is in "Start-Stop Asynchronous" format having a start bit, a stop bit and eight information bits as shown in FIG. 5. When the data signal is used to transmit an operating instruction, five of these bits are address bits and three are an operation code.

Incoming signals on the data line are clocked into a serial to parallel convertor 130 in conventional fashion under control of the clock signal in the case of synchronous transmission or under the control of clock 132 in the case of asynchronous operation. In synchronous systems the clock signal is used to center sample the data. Character sychronization is maintained by the standard method of using the first MARK to SPACE transition received as indication of the beginning of the character. For asynchronous operation, the frequency of clock 132 is 16 times the bit rate at which the data is received. This clock is started at the first MARK to SPACE transition and is counted down to center sample each of the 8 data bits. After the incoming data character is converted from serial format to parallel format, it is transferred to a character latch 135 where it is retained if latch 135 is enabled by latch 122.

The five address bits retained in the character latch are compared by an address comparator 140 with the address of the subscriber's modem, which address is specified in binary code by five switches 145. If the two addresses are the same, an output from address comparator 140 to comparator control logic 150 activates a control latch 160 which retains the three bits of the operation code which are stored in character latch 135. Otherwise, latch 122 is reset.

If the character latch remains enabled, the next character received is likewise stored in the latch. The same five bits of this character are compared with the address of the subscriber's modem. At the same time, the three bits representative of the operation code stored in character latch 135 are compared by a control comparator 170 with the three bits of the previously received operation code which are stored in control latch 160. If the address is correct and the two operation codes are the same, comparator control logic 150 activates control register and decode 180 so that the contents of control latch 160 are read into register 180. There the operation code is decoded to produce an output signal representative of the operating instruction embodied in the operation code. If the address is not correct or if the operation codes are not the same, latch 122 is reset.

During the entire sequence, the 2.0 second timer 116 is running. If for some reason the entire sequence is not completed within two seconds, the timer resets latch 122, thereby disabling the data signal processing equipment and returning the monitor to the idle state.

As will be apparent to those skilled in the art, the invention may be practiced with any type of communication system and many types of communication equipment. One of these is a system with only one polled private line 21, without the need for multiplexers. In this case, the controller 63 and CPU 61 are conected directly to the master modem 35 and the master monitoring unit 37. In general the invention may be used with any type of communication system and equipment in which signaling is directed from a signal source to a terminal. As shown in FIG. 1, the communication system is polled and an address is needed to access a particular subscriber's terminal 11. However, the invention can be practiced in a system in which only one subscriber's modem is accessed. While an address code would not be necessary in such a circumstance, it can be used for further verification of the operating instruction transmitted to the modem.

The practice of the invention is likewise not limited to the type of signal which is monitored for signal transitions. While it is preferred to monitor the CARRIER DETECT or REQUEST TO SEND lines and the DATA line, any of the other signals received at a terminal and controllable by the CPU can be used for the purpose of signaling provided such use does not interfere with the operation of the communication system. Of course, the use of the data signal for transmission of an operation code and an address is greatly preferred since this permits a variety of signals to be transmitted to specified terminals. The requirement that two identical data characters be received before the operation code is decoded is likewise a matter of preference. It is desirable to ensure relatively error-free transmission of the operation code but in some systems it may not be necessary while in other systems even more stringent verification might be desired. As described, all signals may be sent in-band or one or more separate channels may be provided for control signaling. In either case the invention may be practiced simply by monitoring appropriate signals.

While the invention has been described in terms of monitoring transitions in first and second control signals and the reception of eight bit data characters, it will be recognized that the invention may be practiced using more complicated events than a simple signal transition and a less complicated signal than an entire eight bit data character. At a bare minimum, three signal events are required within the times specified. It will be recognized that the invention may be practiced using other signal combinations than two control signals and one or more signals on the bit stream present on the DATA line. However, at least one of the three signal events must occur in a control signal.

The time interval within which the second signal should be detected may be varied from the 0.5 second interval described above. It may be made greater or lesser depending on the degree of error protection desired and the variability in delay that is experienced with the particular communication system in which the invention is practiced. Likewise the two second time limit for decoding the data characters is a matter of preference and may be varied as the situation requires. If desired, the time limit may be keyed to some other event than the first signal. For example, it may be determined by the second signal.

As will be apparent to those skilled in the art, numerous other devices may readily be devised to implement the signal processing features of the apparatus shown in FIG. 2. In addition, the invention may be practiced using any control signals now defined by EIA Standard (RS-232-C) or any future industry standard that is similar such as proposed EIA Standard (SP-1194) revised Jan. 4, 1977.

What is claimed is:

1. In a digital communication system using data and control signals and comprising a signal source, at least one communication channel and at least one terminal, a signal detection method comprising the steps of:
  detecting a first signal event transmitted from said signal source to said terminal;
  detecting a second signal event transmitted from said signal source to said terminal, said second signal event being detected within a specified time interval commencing after said first event;
  detecting thereafter at least one additional signal event transmitted from said signal source to said terminal, said additional signal event being detected within a time limit related to either said first or said second event, at least one of said first, second and additional signal events occurring in a control signal; and
  producing an output signal indicating that said second event and said additional event were detected within the time interval and time limit specified.

2. The method of claim 1 wherein:
  the step of detecting at least one additional event comprises the step of receiving a data signal representative of an operation code; and
  the step of producing an output signal comprises the steps of decoding said operation code and providing an output signal representative of said operation code.

3. The method of claim 1 wherein:
  the step of detecting at least one additional event comprises the steps of:
    receiving a first data signal representative of an operation code;
    receiving a second data signal representative of the same operation code; and
    comparing the two operation codes; and
  the step of producing an output signal comprises the
    decoding said operation code if the two operation codes are the same; and
    providing an output signal representative of said operation code.

4. The method of claim 1 wherein:
  the communication system is a polled network in which at least some terminals are individually addressed;
  the step of detecting at least one additional event comprises the steps of:
    receiving a data signal representative of an address and an operation code; and
    verifying said address; and
  the step of producing an output signal comprises the steps of:
    decoding said operation code if the address is verified; and
    providing an output signal representative of said operation code.

5. The method of claim 1 wherein:
  the communication system is a polled network in which at least some terminals are individually addressed;
  the step of detecting at least one additional event comprises the steps of:
    receiving a first data signal representative of an address and an operation code;
    verifying said address;
    receiving a second data signal representative of an address and an operation code;
    verifying said address in the second data signal; and
    comparing the two operation codes; and
  the step of producing an output signal comprises the the steps of:
    decoding said operation code only if the address is again verified and the two operation codes are the same; and
    providing an output signal representative of said operation code.

6. The method of claim 1 wherein:
  the communication system is a polled network in which at least some terminals are individually addressed;
  the step of detecting at least one additional event comprises the steps of:
    receiving data signals representative of at least two addresses and two operation codes;
    verifying each of the addresses received; and
    comparing the operation codes; and
  the step of producing an output signal comprises the steps of:
    decoding said operation code only if the addresses are verified and the operation codes are the same; and
    providing an output signal representative of said operation code.

7. The method of claim 1 wherein the first and second events are transitions in a control signal from one binary signal level to another.

8. The method of claim 1 wherein the first and second events are detected in the same control signal.

9. The method of claim 1 wherein the communication system is an in-band communication system and the first and second events take place in the carrier detect or request to send signal.

10. The method of claim 1 wherein the communication system is an in-band communication system, the first event is a drop in the carrier detect or request to send signal, the second event is a rise in the carrier detect or request to send signal, and said at least one additional signal is at least one data character.

11. In a digital communication system using data and control signals and comprising a signal source, at least one communication channel and at least one terminal, a method for detecting at the terminal an operating instruction transmitted from the signal source, said method comprising the steps of:
  detecting a first signal event in a control signal received at said terminal;
  detecting a second signal event in a control signal received at said terminal, said second signal being detected within a specified time interval commencing after said first event;
  detecting thereafter at least one data character transmitted from the signal source and received at said terminal, said data character being detected within a time limit related to either said first or said second event;
  decoding an operation code in said data character; and
  producing an output signal representative of the operating instruction embodied in said operation code.

12. The method of claim 11 wherein:
  the step of detecting at least one data character comprises the steps of:
    receiving a first data signal representative of an operation code;
    receiving a second data signal representative of the same operation code; and comparing the two operation codes; and
the step of decoding said operation code is performed only if the two operation codes are the same.

13. The method of claim 11 wherein:
the communication system is a polled network in which at least some terminals are individually addressed;
the step of detecting at least one data character comprises the steps of:
receiving a first data signal representative of an address and an operation code; and
verifying said address; and
the step of decoding said operation code is performed only if the address is verified.

14. The method of claim 11 wherein:
the communication system is a polled network in which at least some terminals are individually addressed;
the step of detecting at least one data character comprises the steps of:
receiving a first data signal representative of an address and an operation code;
verifying said address;
receiving a second data signal representative of an address and an operation code if the address is verified;
verifying said address in the second data signal; and
comparing the two operation codes; and
the step of decoding said operation code is performed only if the address is again verified and the two operation codes are the same.

15. The method of claim 11 wherein:
the communication system is a polled network in which at least some terminals are individually addressed;
the step of detecting at least one data character comprises the steps of:
receiving data signals representative of at least two addresses and two operation codes;
verifying each of the addresses received; and
comparing the operation codes; and
the step of decoding said operation code is performed only if the addresses are verified and the operation codes are the same.

16. The method of claim 11 wherein the first and second events are transitions in the control signal from one binary signal level to another.

17. The method of claim 11 wherein the first and second events are detected in the same control signal.

18. The method of claim 11 wherein the communication system is an in-band data communication system and the first and second events take place in the carrier detect or request to send signal.

19. In a digital communication system using data and control signals and comprising a signal source, at least one communication channel and at least one terminal, apparatus for detecting a signal comprising:
means for detecting a first signal event transmitted from said signal source to said terminal;
means for detecting a second signal event transmitted from said signal source to said terminal, said second signal even being detected within a specified time interval commencing after said first event;
means for detecting thereafter at least one additional signal event transmitted from said signal source to said terminal, said additional signal being detected within a time limit related to either said first or said second event, at least one of said first, second and additional signal events occurring in a control signal; and
means for producing an output signal indicating that said second event and said additional event were detected within the time interval and time limit specified.

20. The apparatus of claim 19 wherein:
the means for detecting at least one additional event comprises means for receiving a data signal representative of an operation code; and
the means for producing an output signal comprises means for decoding said operation code and providing an output signal representative of said operation code.

21. The apparatus of claim 19 wherein:
the means for detecting at least one additional event comprises:
means for receiving a data signal representative of an operation code;
means for storing a first such data signal; and
means for comparing said first such data signal with a second such data signal representative of an operation code; and
the means for producing an output signal comprises the the steps of:
means for decoding said operation code if the operation codes represented by the first and second data signals are the same; and
means for providing an output signal representative of said operation code.

22. The apparatus of claim 19 wherein:
the communication system is a polled network in which at least some terminals are individually addressed;
the means for detecting at least one additional event comprises:
means for receiving a data signal representative of an address and an operation code; and
means for verifying said address; and
the means for producing an output signal comprises:
means for decoding said operation code if the address is verified; and
means for providing an output signal representative of said operation code.

23. The apparatus of claim 19 wherein:
the communication system is a polled network in which at least some terminals are individually addressed;
the means for detecting at least one additional event comprises:
means for receiving a data signal representative of an address and an operation code;
means for verifying said address;
means for storing that portion of a first such data signal which is representative of an operation code; and
means for comparing that portion of the first such data signal which is representative of an operative code with that portion of a second data signal representative of an operation code; and
the means for producing an output signal comprises:
means for decoding said operation code only if an address in the second data signal is verified and the two operation codes are the same; and
means for providing an output signal representative of said operation code.

24. The apparatus of claim 19 wherein:

the communication system is a polled network in which at least some terminals are individually addressed;

the means for detecting at least one additional event comprises:
means for receiving a data signal representative of at least two addresses and two operation codes;
means for verifying each of the addresses received; and the means for producing an output signal comprises:
means for decoding said operation code only if the addresses are verified and the operation codes are the same; and
means for providing an output signal representative of said operation code.

25. The apparatus of claim 19 wherein the first and second events are transitions in a control signal from one binary signal level to another.

26. The apparatus of claim 19 wherein the first and second events are detected in the same control signal.

27. The apparatus of claim 19 wherein the communication system is an in-band data communication system and the first and second events take place in the carrier detect or request to send signal.

28. The apparatus of claim 19 wherein the communication system is an in-band data communication system, the first event is a drop in the carrier detect or request to send signal, the second event is a rise in the carrier detect or request to send signal, and said at least one additional signal event is at least one data character.

29. In a digital communication system using data and control signals and comprising a signal source, at least one communication channel and at least one terminal, apparatus at the terminal for detecting an operating instruction transmitted from the signal source, said apparatus comprising:
means for detecting a first signal event in a control signal received at said terminal;
means for detecting a second signal event in a control signal received at said terminal, said second signal event being detected within a specified time interval commencing after said first event,
means for detecting thereafter at least one data character transmitted from the signal source and received at said terminal, said data being detected within a time limit related to either said first or said second event;
means for decoding an operation code in said data character; and
means for producing an output signal representative of the operating instruction embodied in said operation code.

30. The apparatus of claim 29 wherein:
The means for detecting at least one data character comprises:
means for receiving a data signal representative of an operation code;
means for storing the first such data signal resentative of an operation code; and
means for comparing said first such data signal with a second such data signal representative of an operation code; and
the means for decoding an operation code is activated only if the operation codes represented by the first and second series are the same.

31. The apparatus of claim 29 wherein:
the communication system is a polled network in which at least some terminals are individually addressed;
the means for detecting at least one data character comprises:
means for receiving a data signal representative of an address and an operation code; and
means for verifying said address; and
the means for decoding said operation code is activated only if the address is verified.

32. The apparatus of claim 29 wherein:
the communication system is a polled network in which at least some terminals are individually addressed;
the means for detecting at least one data character comprises:
means for receiving a data signal representative of an address and an operation code;
means for verifying said address;
means for storing that portion of a first such data signal which is representative of an operation code; and
means for comparing that portion of the first such data signal which is representative of an operation code with that portion of a second data signal representative of an operation code; and
the means for decoding an operation code is activated only if an address in the second data signal is verified and the two operation codes are the same.

33. The apparatus of claim 29 wherein:
the communication system is a polled network in which at least some terminals are individually addressed;
the means for detecting at least one data character comprises:
means for receiving a data signals representative of at least two addresses and two operation codes;
means for verifying each of the addresses received; and
means for comparing the operation codes; and
the means for decoding an operation code is activated only if the addresses are verified and the operation codes are the same.

34. The apparatus of claim 29 wherein the first and second events are transitions in a control signal from one binary signal lever to another.

35. The apparatus of claim 29 wherein the first and second events are detected in the same control signal.

36. The apparatus of claim 29 wherein the communication system is an in-band data communication system in which the first and second events take place in the carrier detect or request to send signal.

* * * * *

UNITED STATES PATENT AND TRADEMARK OFFICE
CERTIFICATE OF CORRECTION

PATENT NO. : 4,095,045
DATED : June 13, 1978
INVENTOR(S) : Charles P. Johnson et al.

It is certified that error appears in the above—identified patent and that said Letters Patent are hereby corrected as shown below:

column 7, line 37, after "the" (last word) insert -- steps of; --.

Signed and Sealed this

Fifth Day of December 1978

[SEAL]

Attest:

RUTH C. MASON
Attesting Officer

DONALD W. BANNER
Commissioner of Patents and Trademarks